United States Patent
Bunker et al.

(10) Patent No.: US 6,731,447 B2
(45) Date of Patent: May 4, 2004

(54) SECURE DATA FILE ERASURE

(75) Inventors: Keith G. Bunker, Hilton, NY (US); Edward P. deJong, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 339 days.

(21) Appl. No.: 09/871,877

(22) Filed: Jun. 4, 2001

(65) Prior Publication Data

US 2002/0181134 A1 Dec. 5, 2002

(51) Int. Cl.$^7$ ............................................... G11B 19/04
(52) U.S. Cl. ........................................... 360/60; 360/66
(58) Field of Search .............................. 360/66, 60, 57, 360/1, 39, 40, 31, 72.2, 78.14, 18; 369/69, 70, 13.25, 13.16; 380/22

(56) References Cited

U.S. PATENT DOCUMENTS

| | | | | |
|---|---|---|---|---|
| 4,228,348 A | * | 10/1980 | Lee | 360/57 |
| 4,516,165 A | * | 5/1985 | Cunningham | 360/53 |
| 6,014,279 A | * | 1/2000 | Yamagata | 360/66 |
| 6,507,448 B2 | * | 1/2003 | Nishida | 360/66 |

* cited by examiner

Primary Examiner—Alan T. Faber
(74) Attorney, Agent, or Firm—David Henn

(57) ABSTRACT

A process that ensures the destruction of data files a user wishes to completely erase from a storage medium, such as a hard drive or removable disk. A system administrator can select a quantity of and pattern to be used in overwrites of the data file so that no one can recover the data from the storage medium. In embodiments, a graphical user interface (GUI) can be provided to allow user triggering of and parameter setting for the process. The GUI can be implemented at a device in which the storage medium is a component or can be implemented in a device driver GUI on a personal computer in communication with the device.

25 Claims, 8 Drawing Sheets

SECURE DATA FILE ERASURE

CROSS-REFERENCE TO RELATED APPLICATIONS

Does not apply.

FIELD OF THE INVENTION

The invention relates to secure erasure of sensitive or private data from storage media.

BACKGROUND OF THE INVENTION

Many photocopiers, printers, and other reproduction and printing devices now include non-volatile memory (NVM), such as magnetic and optical storage media and including removable disk systems, hard drives, and other storage media systems allowing the device and/or a user to store a job the device uses or is directed to use the stored job. In high security areas (e.g., military installations), there is often a requirement that all jobs that stored on NVM of a device shall be inaccessible once the job is completed. Additionally, users in lower security area often wish to erase data they would like to keep private or confidential for various reasons.

The currently prevalent method of deleting a file is to delete the pointers and/or directory information that allows the device to locate the data; the document images/data files themselves are still resident in the NVM. This method usually does not meet the requirement that the job data shall be erased from the NVM once the job is complete. Current workarounds include: (1) removal of the NVM from the device and locked up at night, or (2) prohibiting NVM installation in the first place.

Lately, secure erase systems that overwrite the data with patterns of 1s, 0s, or random combinations thereof have come into use to meet erasure requirements. However, government agencies and other customers have different requirements as to how many times one can overwrite the appropriate portions of NVM once a job or task is completed, which can lead to difficulties in product design and implementation.

SUMMARY OF THE INVENTION

Embodiments of the invention allow a user or a system administrator (SA) to program a device to overwrite the region of NVM in which the data file associated with a print, scan, fax, copy, or other job resides. In embodiments, the data file is overwritten more than once, such as from 2 to about 50 time, with the exact number of overwrites being determined according to a stored default value or a user-input value. Further, in embodiments, the data file is overwritten with a different pattern on each overwrite according to a stored default value or a user-input value. For example, if a user has just printed something stored on a floppy disk, the user can erase it securely with a sequence of patterns of choice. Instead of trying to settle on a single algorithm (e.g., overwrite 3 times, first time with 1s, the second time with 0s, the third time with a random pattern), this allows overwriting "n" times with a set of patterns that can be downloaded to the device.

Thus, the device, medium, and process of the present invention can have, in various embodiments, three parameters:

1. A set of patterns with which the portion of the hard drive that is to be erased will be overwritten. This could be a table of patterns that will be used to overwrite the disk. In embodiments, the table of patterns can be generated in a manner allowing a customer/SA to preprogram the patterns so that the patterns are in a sequence that satisfies an installation's particular security requirements. In pseudo code, this looks like:

PatternTable (N)←Pattern1, Pattern2, Pattern3, . . . PatternN;

2. A site settable value that allows the customer/SA to program how many patterns with which to overwrite the portion of the hard drive that should be overwritten. The site settable value can be, for example, between 1 and about N (N is the number of patterns in PatternTable). In various embodiments, for example, NumPatternToUse is this site settable value.

3. A site settable value that allows the customer/SA to program how many times the entire set of patterns should be run. It can have any positive value. In various embodiments, NumberOfTimesToCycle can be this value.

The algorithm then uses, in various embodiments, the patterns and the number of overwrites to overwrite the portion of the disk N times. An example of a routine that can be used in embodiments of the invention employing a value like NumberOfTimesToCycle is the pseudocode expression:

For count←1 to NumPatternToUse Do
Overwrite region of storage media that stored the data file with PatternTable(count);

This allows for a flexible, programmable sequence of overwrites that should satisfy any overwrite requirement by any customer. Embodiments using a value like NumberOfTimesToCycle can use a routine such as, for example, that expressed by the pseudocode expression:

For NumberOfOverwriteCycle←1 to NumberOfTimesToCycle Do
For count←1 to NumPatternToUse Do
Overwrite region of storage media that stored the data file with PatternTable(count);

Embodiments of the invention employ a user interface (UI) or client activated erase trigger to automatically place the digital copier or printer into, for example, an Image Disk Erasing Routine, where an Image Disk is a storage media used by the device to store data files including scanned images of documents and/or print job data and the like. An example of such an Erasing Routine is a routine that executes three complete erasures with a check to ensure the data is completely erased; per industry or security approved processes. The Erasing Routine removes or destroys any residual data files including documents, images, and the like, on the Image or ESS Disks. In embodiments, a customer selectable UI/client button with confirmation that the process was completed could activate this routine. During this erasing feature, the system would be offline.

Thus, a feature of the invention to provide a storage medium security erase system comprising an erase trigger that tells a drive sector analyzer to retrieve data file location information from a CPU and send the location information to a secure storage medium eraser that overwrites the data file according to a predetermined secure erase method, the eraser using a type of overwrite pattern and a number of overwrites determined by an erase pattern determiner according to predetermined criteria and/or user input.

An additional feature of the invention is to apply a method of securely erasing a data file by a providing an erase trigger, determining a location of the data file on the storage medium, overwriting the data file according to a predetermined secure erase method, and determining at least a number of times to overwrite the data file in response to the erase trigger and according to predetermined criteria.

Figure 5:
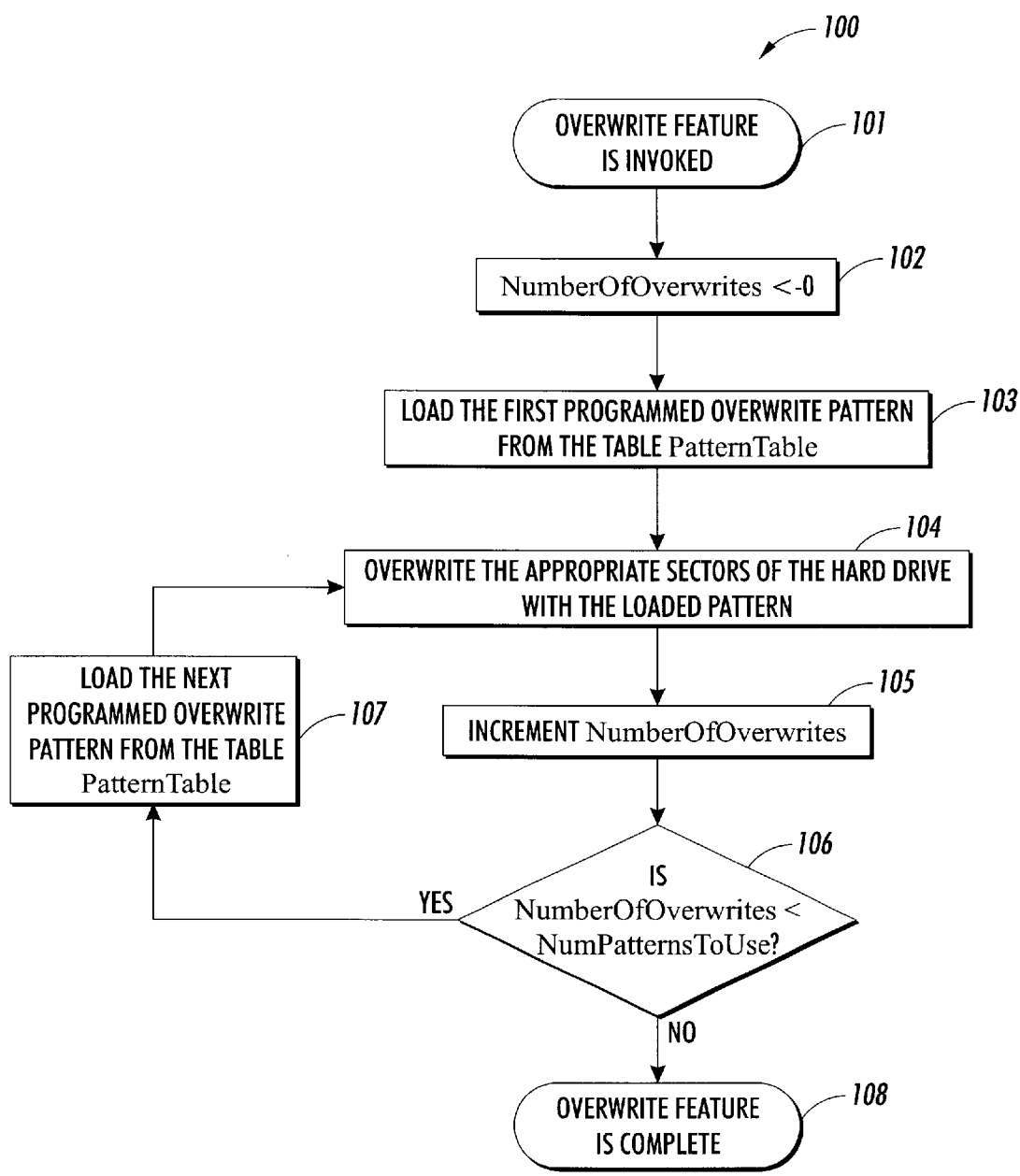
Figure 6:
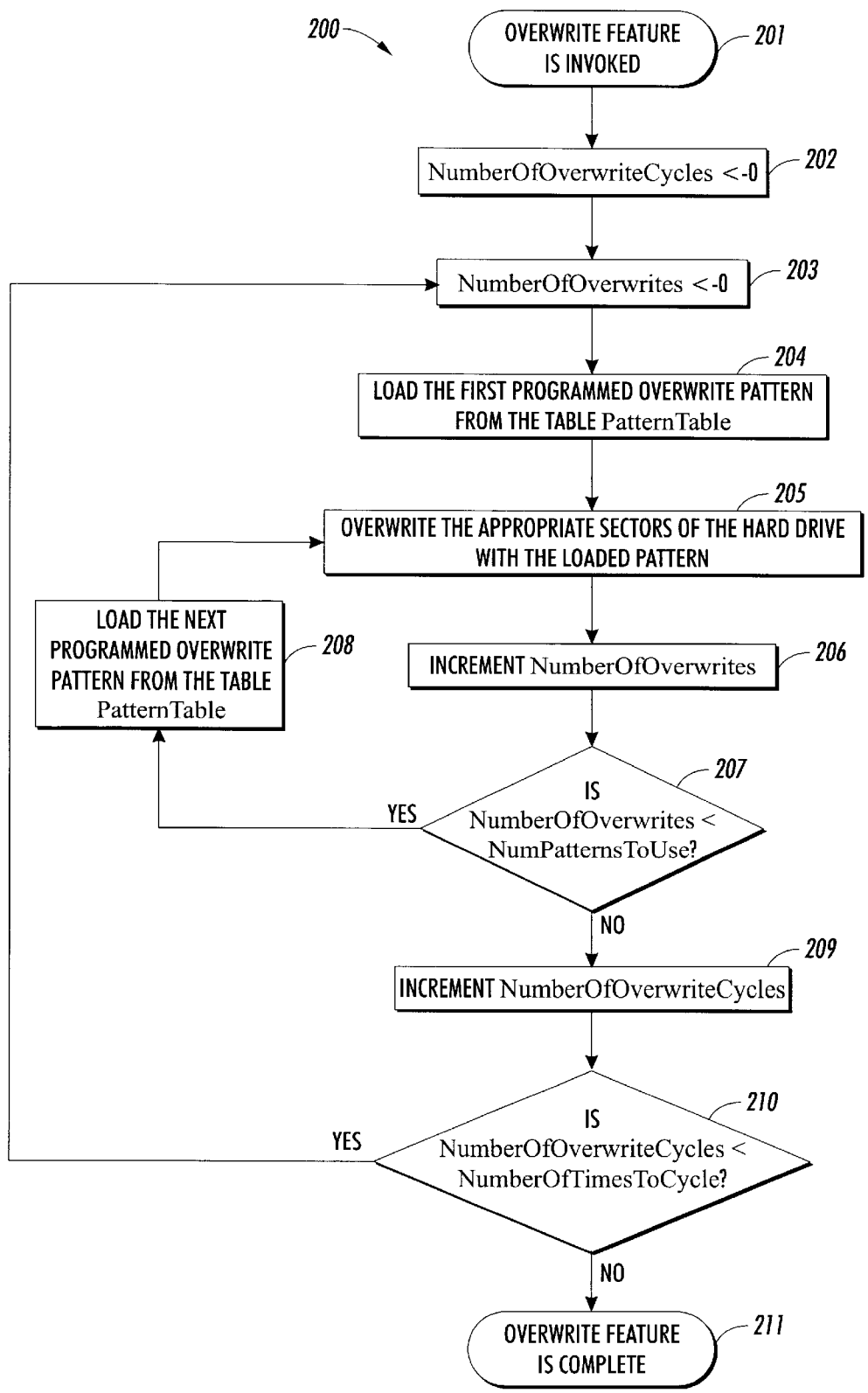

Illustrated in FIGS. 5 and 6 are flow charts relating to the erasure processes of embodiments of the present invention.

DETAILED DESCRIPTION OF THE INVENTION

With reference to the accompanying FIGURES, various embodiments of the invention include a device 1, such as a scanner, printer, photocopier, or other device, having a non-volatile memory (NVM) 2, such as a magnetic or optical storage medium, to which the device 1 can store data 3 and/or from which the device can read data 3 stored in a data file 4. In embodiments, the device 1 can use the data 3 to produce output, such as paper hard copy of a word processing document or the like.

Various embodiments of the invention use a CPU 5 of the device 1 in which elements of the invention reside and that provides and executes various processes of the invention. For example, the CPU 5 can provide or respond to an erase trigger 6. The erase trigger 6 in embodiments of the invention can be a physical button on the device, a virtual button on, for example, an LCD of the device, or an instruction sent to the device as part of the data file 4 used to generate output from client software, such as a driver interface 7 on a remote computer. The CPU 5 stores the data file 4 in the NVM 2, which can be a fixed or removable storage medium, and keeps track of the data file 4 so that, when the erase trigger 6 is set, the erasure process can determine a location 8 of the data file on the NVM 2. The erasure process then overwrites the data file 4 according to a predetermined secure erase method; in embodiments of the invention, the secure erase method can include overwriting the data file 4 a particular number of times 9, using a particular pattern 10 to overwrite the data file 4 (such as all 1s, all 0s, etc.), and/or cycling the overwrite pattern on each iteration of the overwrite process 11. Other iteration and pattern variations can also be used.

To determine at least a number of times to overwrite the data file 4, the erasure process can check or respond to, for example, the erase trigger 6, which can include this information. Alternatively, in embodiments where the invention is implemented in a photocopier or the like, the user can be prompted to enter the number of times 9 and/or pattern(s) 10 to use to overwrite the data file 4. In embodiments in which the erase trigger 6 is provided from a driver interface 7, the user can provide the number of times 9 and/or pattern(s) 10 to use to overwrite the data file 4 when creating the job in the first place. Other user interfaces could also be employed, such as a web- or markup-language-based interface usable over a network and other interfaces, to provide the erase trigger 6 and the various parameters a user might be allowed to enter.

Figure 1:
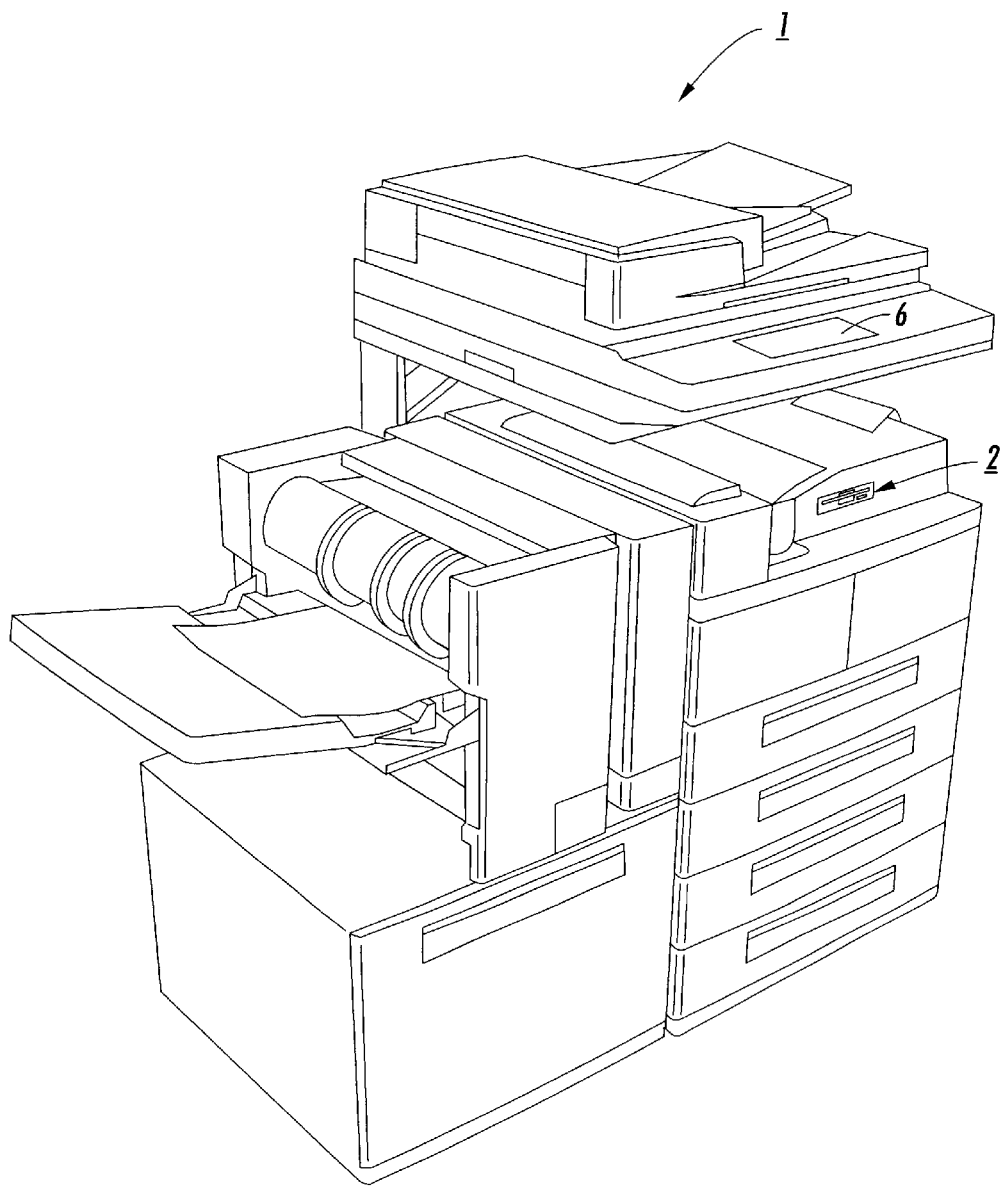
FIG. 1 is a perspective view of a digital printing and/or reproducing device that can use embodiments of the invention.
Figure 2:
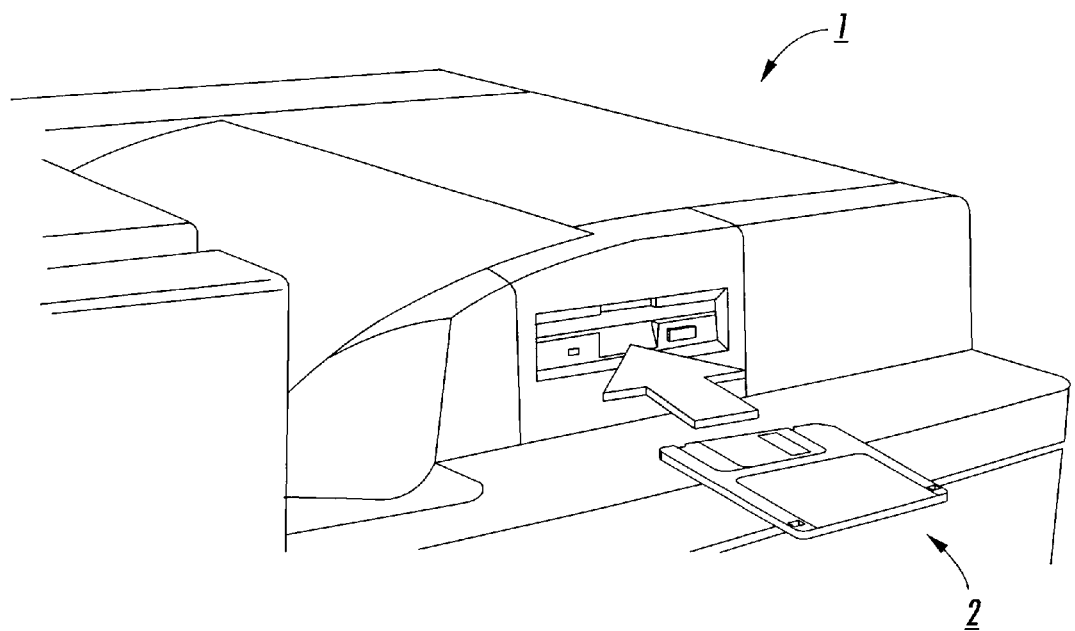
FIG. 2 is a close-up perspective view of a removable storage media drive of the device shown in FIG. 1.
Figure 3A:
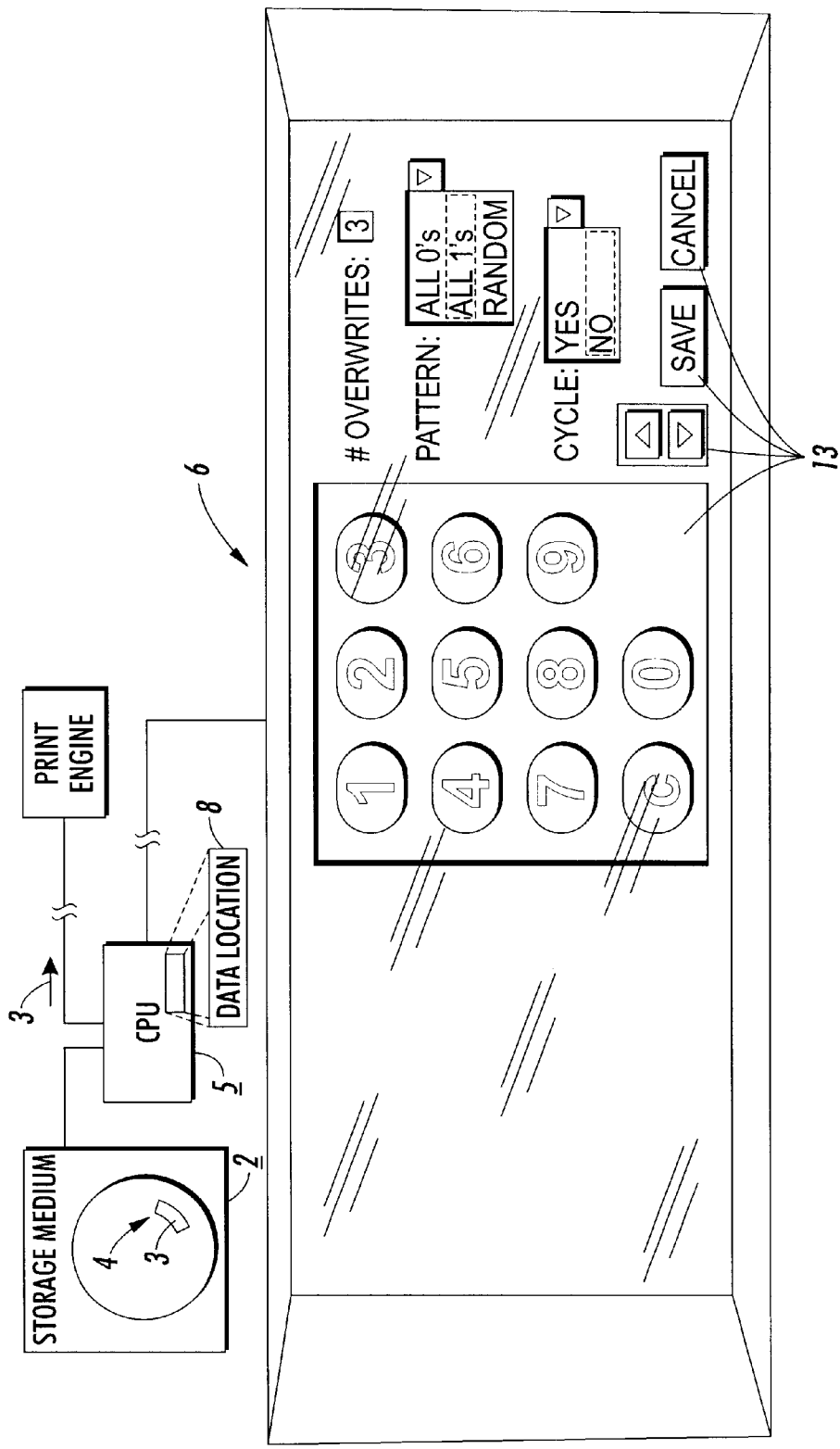
FIGS. 3A–3C are elevational views of a display panel of the device of FIG. 1 showing a graphical user interface in which a user can select parameters of embodiments of the invention.
Figure 3B:
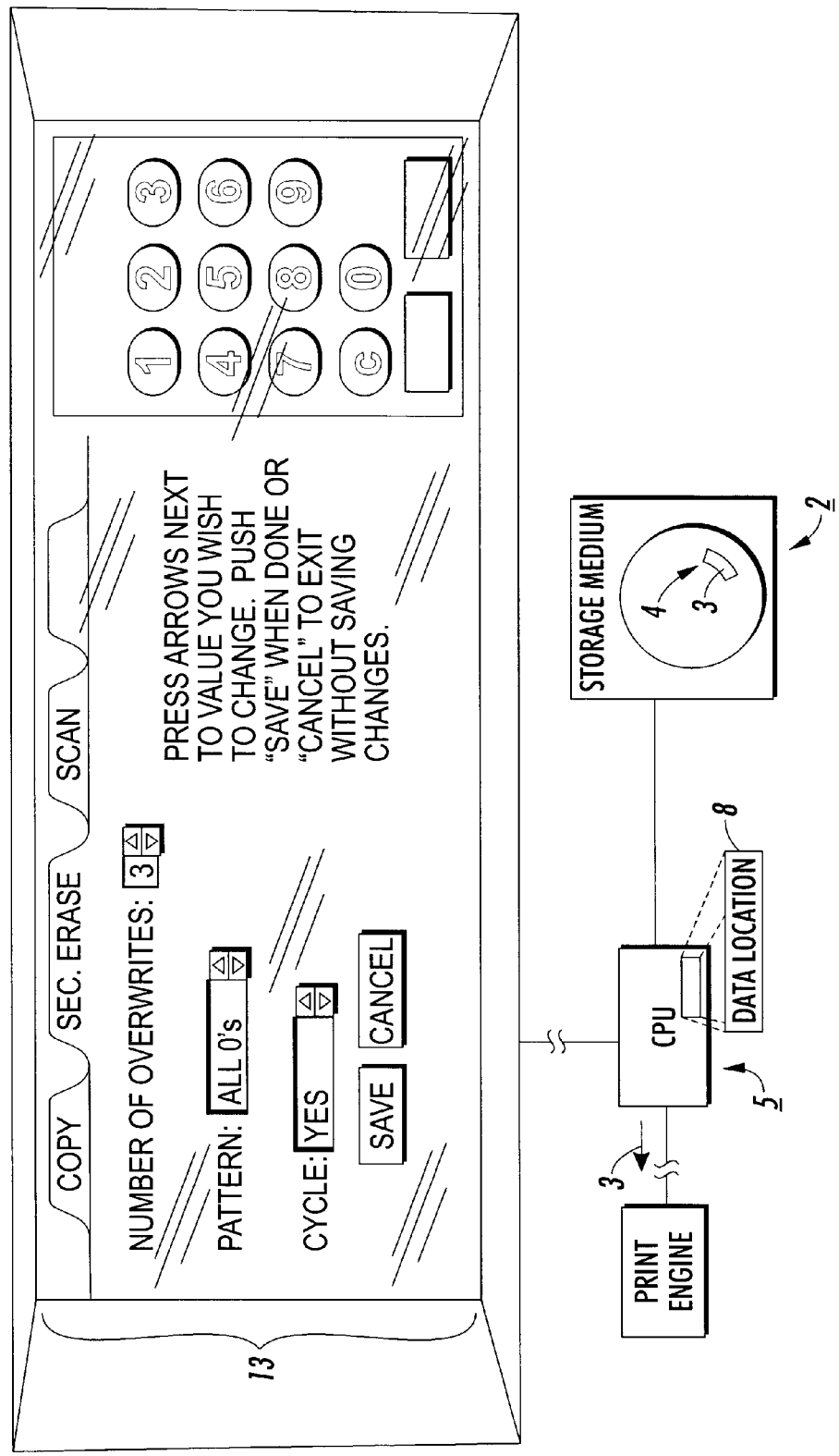

In embodiments allowing user selection of the various parameters, the CPU 5 can provide one or more graphical user interface (GUI) element(s) 13 in communication with or acting as the erase trigger 6. The CPU 5 can accept the user-selected parameter(s) from the GUI element(s) 13 with which to overwrite the data file. For example, the GUI element can be a virtual button or keypad displayed on a pressure-sensitive display of the device, such as that shown in FIGS. 3A and 3B. In embodiments, the GUI element(s) 13 can be part of a driver interface similar to that shown in FIG. 4.

In addition to user-selectable criteria, embodiments of the invention can allow a system administrator (SA) to program the device 1 to overwrite the data file 4 according to predetermined criteria, such as a stored number of overwrites 9 and/or sequence of patterns 10 of choice. Rather than trying to settle on a single algorithm (e.g., overwrite 3 times, first time with 1s, the second time with 0s, the third time with a random pattern) for all customers, this allows selection by the SA during setup or reconfiguration of the device 1. Further, embodiments of the invention can allow the SA to program a timer that will automatically delete all data files after a specified period has elapsed.

Where more than one pattern 10 is available, a set of patterns 12 can be stored in a storage medium 2 in communication with the system. The set of patterns 12 can be stored in a computer memory or another storage medium in, for example, a table, such as a table resembling the pseudocode expression:

PatternTable (N)←Pattern1, Pattern2, Pattern3, . . . PatternN.

The invention can then use the set of patterns 12, the number of times to overwrite 9, and a pattern selection variable to erase the data file 4 by overwriting. For example, in embodiments of the invention, the user-selected pattern NumPatternToUse to be used and a number of times N to overwrite the data file 4 according to the pseudocode expression:

For count←1 to NumPatternToUse Do
Overwrite region of storage media that stored the data file with PatternTable(count);

FIGS. 5 and 6 show two flow charts that show how embodiments of the invention might carry out the erasure process. Referring to FIG. 5, an embodiment of the process 11 using predetermined patterns from a pattern table, as well as a predetermined number of patterns to use (expressed by the variable NumPatternsToUse) is shown in flow chart 100. The erase trigger 6 is represented in the beginning block 101 of the flow chart 100 and an initial step is to set the counter NumberOfOverwrites to 0 as shown in block 102. Next, the first overwrite pattern is loaded from the pattern table, as seen in block 103. The data file 4 is overwritten using the loaded pattern as illustrated in block 104, and the NumberOfOverwrites is incremented as seen in block 105. The counter is compared to the number of patterns to use as shown in block 106. If the counter value is less than the number of patterns to use, then the next pattern is loaded as seen in block 107, and the steps shown in blocks 104–107 continue to be executed until the counter value is no longer less than the number of patterns to use, at which point the overwrite is complete, as expressed in block 108.

Referring to FIG. 6, an embodiment of the invention 11 using predetermined patterns from a pattern table, as well as a predetermined number of patterns to use (expressed by the variable NumPatternsToUse) is shown in flow chart 200 with the added feature of a number of overwrite cycles to be completed. The erase trigger 6 is represented in the beginning block 201 of the flow chart 200 and an initial step is to set the counter NumberOfOverwriteCycles to 0 as shown in block 202, then to set the counter NumberOfOverwrites to 0 as shown in block 203. Next, the first overwrite pattern is loaded from the pattern table, as seen in block 204. The data file 4 is overwritten using the loaded pattern as illustrated in block 205, and the NumberOfOverwrites is incremented as seen in block 206. The counter NumberOfOverwrites is compared to the number of patterns to use as shown in block 207. If the counter value is less than the number of patterns to use, then the next pattern is loaded as seen in block 208, and the steps shown in blocks 205–208 continue to be executed until the counter NumberOfOverwrites has a value that is no longer less than the number of patterns to use, at which point the particular overwrite is complete and the counter NumberOfOverwriteCycles incremented, as expressed in block 209. As shown in block 210, the value of the counter NumberOfOverwriteCycles is compared to a predetermined NumberOfTimesToCycle. If this counter value is less than the number of times to cycle, then the counter NumberOfOverwrites is reset, and the steps shown in blocks 203–210 continue to be executed until the counter NumberOfTimesToCycle has a value that is no longer less than the number of times to cycle, at which point the particular overwrite is complete as seen in block 211.

Figure 3C:
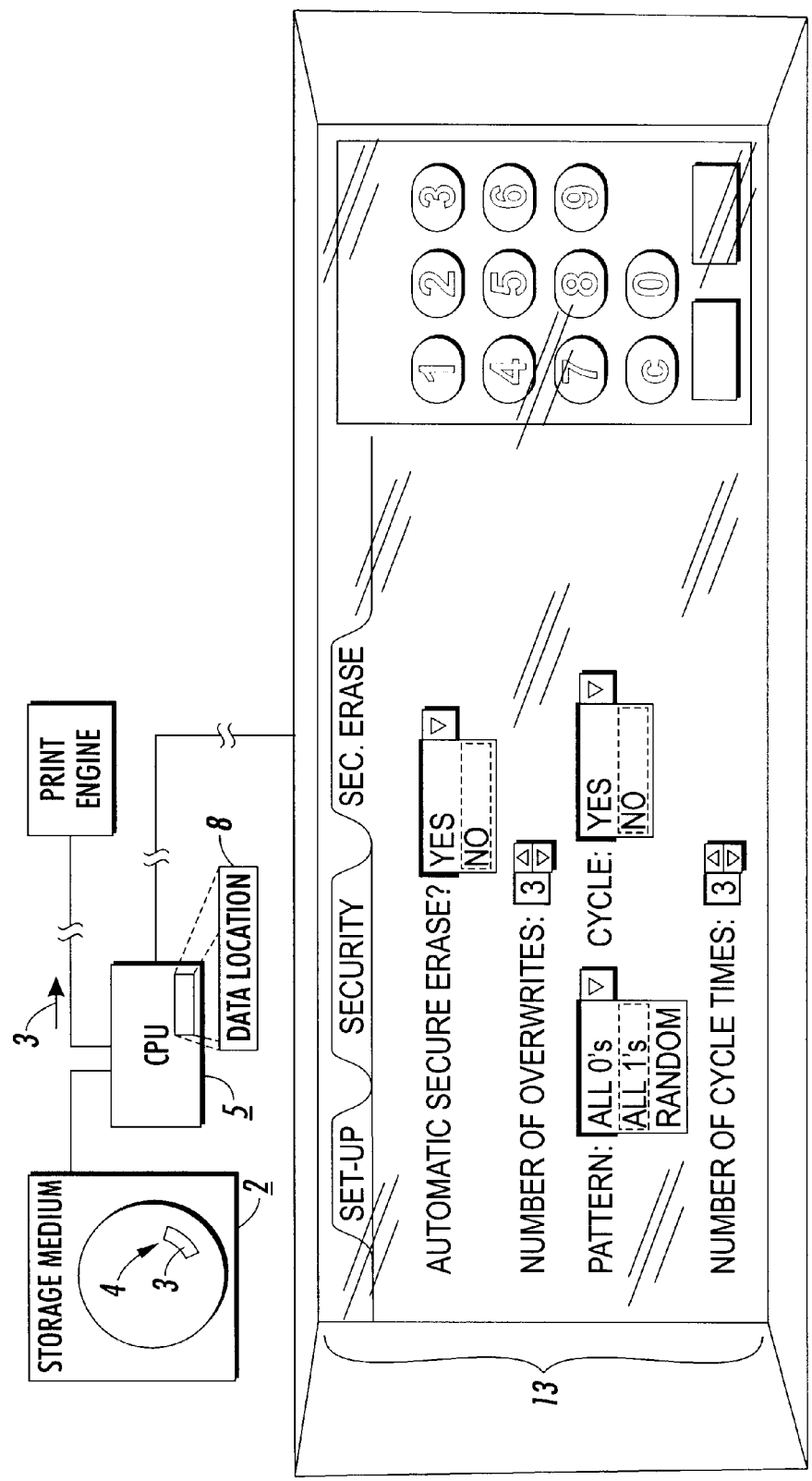
Figure 4:
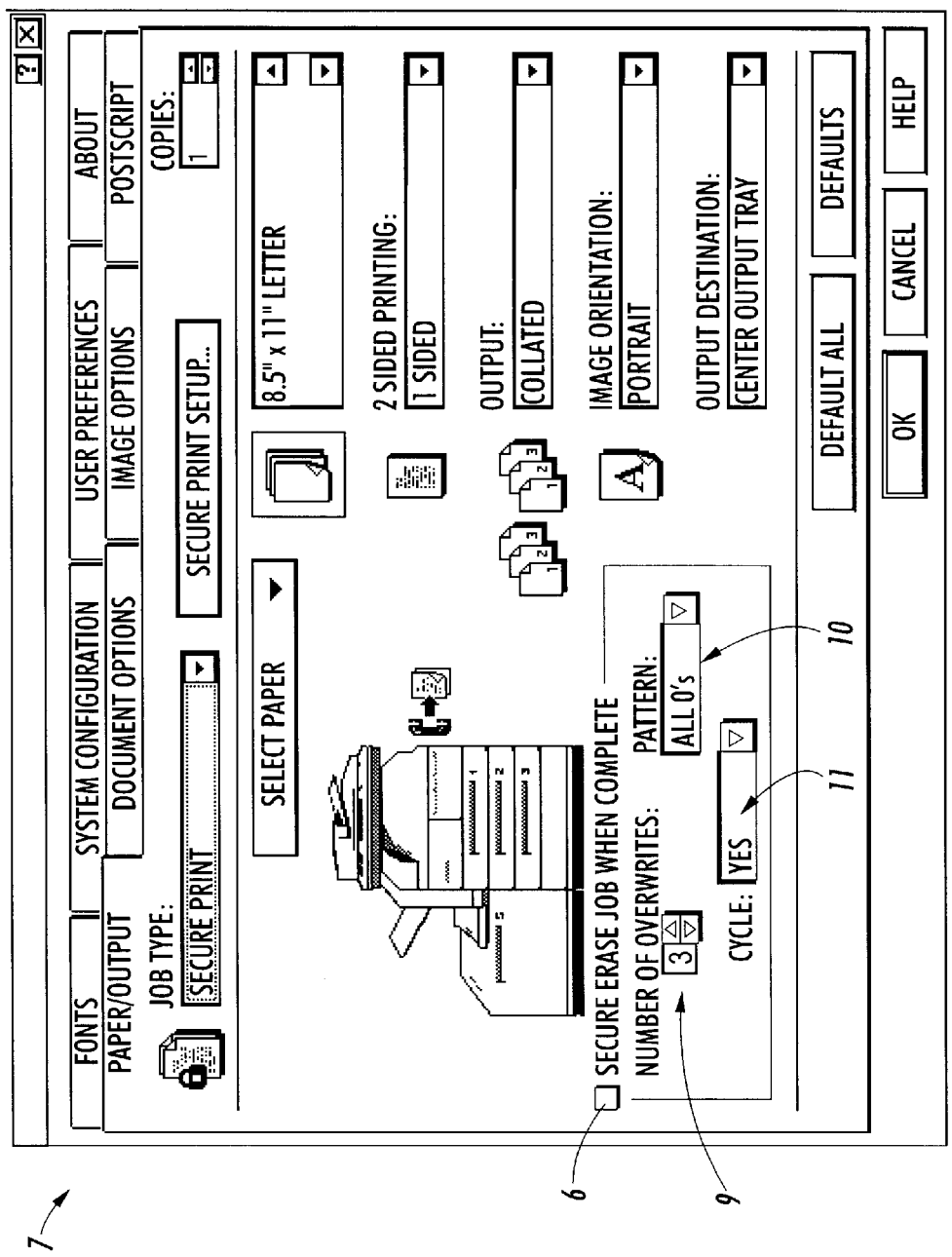
FIG. 4 is a schematic of a graphical user interface dialog box of a driver that can be implemented on a personal computer to control the device shown in FIG. 1, the dialog box allowing selection of parameters of embodiments of the invention.

As should be readily apparent to one of ordinary skill in the art, the preprogrammed values of NumberOfOverwrites and NumberOfTimesToCycle, as well as the preselected patterns, of the particular processes shown in FIGS. 5 and 6 could be user selected values entered into the system using apparatus and methods such as those shown in FIGS. 3 and 4, among others.

Thus, in installations where customers wish to ensure data security, such as high security areas like military installations, customers can meet the requirement that all printed/copied jobs stored on hard drive(s) or other storage media of such devices be inaccessible once the job has completed without removing the storage medium. In addition, many customers simply want to ensure the privacy of their information and wish to erase print and/or copy jobs from storage media on which the jobs might be stored. The current conventional method of deleting a file (deleting the pointers to the data) can still be done, but the method according to embodiments of the invention ensures that data files themselves no longer reside on the disk and can not be recovered.

Other modifications of the present invention may occur to those skilled in the art subsequent to a review of the present application, and these modifications, including equivalents thereof, are intended to be included within the scope of the present invention.

What is claimed is:

1. A device comprising:
   an erase trigger;
   a drive sector analyzer in communication with a CPU that has addressed a data file stored on a storage medium, the drive sector analyzer retrieving data file location data from the CPU in response to activation of the erase trigger;
   a secure storage medium eraser in communication with the drive sector analyzer that overwrites the data file according to a predetermined secure erase method;
   an erase pattern determiner in communication with the erase trigger and the secure storage medium eraser, the erase pattern determiner sending to the secure storage eraser a type and number of times to overwrite the data file in response to the erase trigger and according to predetermined criteria.

2. The device of claim 1 further comprising a set of patterns stored in a storage medium in communication with the system.

3. The device of claim 2 wherein the set of patterns is a table resembling the pseudocode expression:
   PatternTable (N)←Pattern1, Pattern2, Pattern3, . . . PatternN.

4. The device of claim 1 wherein the predetermined criteria includes erase control parameters and the device further comprises an erase control parameter selector addressable by a user to select parameters with which to erase the data file.

5. The device of claim 4 wherein the parameters include at least one pattern to be used to erase the data file.

6. The device of claim 4 wherein the parameters include at least a number of times to overwrite the data file.

7. The device of claim 4 wherein the parameters include at least one pattern NumPatternToUse to be used and a number of times N to overwrite the data file according to the pseudocode expressions:
   For count←1 to NumPatternToUse Do
   Overwrite data file with PatternTable(count).

8. The device of claim 7 wherein multiple patterns NumPatternToUse are used $N_i$ times, respectively, to overwrite the data file.

9. The device of claim 1 further including at least one graphical user interface (GUI) element in communication with the erase trigger and which accepts from a user parameters with which to overwrite the data file.

10. The device of claim 9 wherein the at least one GUI element includes a button.

11. The device of claim 9 wherein the at least one GUI element includes a virtual numerical keypad with which a user selects a number as a parameter.

12. The device of claim 9 wherein the at least one GUI element includes a pattern selector with which a user can select a pattern as a parameter.

13. A method of securely erasing at least one data file from a storage medium, the method comprising:
   providing an erase trigger;
   determining a location of the data file on the storage medium;
   overwriting the data file according to a predetermined secure erase method;
   determining at least a number of times to overwrite the data file in response to the erase trigger and according to predetermined criteria.

14. The method of claim 13 further comprising determining a number of times to perform the at least a number of times to overwrite the data file.

15. The method of claim 13 further comprising providing a set of patterns stored in a storage medium in communication with the system, the set of patterns being at least part of the predetermined criteria.

16. The method of claim 15 further including providing the set of patterns as a table resembling the pseudocode expression:
   PatternTable (N)←Pattern1, Pattern2, Pattern3, . . . PatternN.

17. The method of claim 13 wherein the predetermined criteria include at least one user-selected parameter and the method further comprises receiving at least one user-selected parameter with which to erase the data file.

18. The method of claim 17 wherein the at least one user-selected parameter includes at least one pattern to be used to erase the data file.

19. The method of claim 17 wherein the at least one user-selected parameter includes at least a number of times to overwrite the data file.

20. The method of claim 17 wherein the at least one user-selected parameter includes at least one pattern NumPatternToUse to be used and a number of times N to overwrite the data file according to the pseudocode expression:

For count←1 to NumPatternToUse Do
    Overwrite region of storage media that stored the data file with PatternTable(count).

21. The method of claim 20 further including overwriting the data file with multiple patterns NumPatternToUse used $N_i$ times, respectively.

22. The method of claim 13 further comprising providing at least one graphical user interface (GUI) element in communication with the erase trigger and accepting from the at least one GUI element a user parameters with which to overwrite the data file.

23. The method of claim 22 further comprising providing a button as at least part of the at least one GUI element.

24. The method of claim 22 further comprising providing a virtual numerical keypad as at least part of the at least one GUI element and with which a user selects a number as a parameter.

25. The method of claim 22 further comprising a pattern selector as at least part of the at least one GUI element and with which a user can select a pattern as a parameter.

* * * * *

UNITED STATES PATENT AND TRADEMARK OFFICE
CERTIFICATE OF CORRECTION

PATENT NO.   : 6,731,447 B2
DATED        : May 4, 2005
INVENTOR(S)  : Keith G. Bunker et al.

It is certified that error appears in the above-identified patent and that said Letters Patent is hereby corrected as shown below:

Title page,
Item [75], Inventors, insert the following:
-- Keith G. Bunker, Hilton, NY (US);
   Edward P. deJong, Rochester, NY (US);
   Bruce E. Talbot, Webster, NY (US) --.

Signed and Sealed this

Thirty-first Day of January, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,731,447 B2 |
| APPLICATION NO. | : 09/871,877 |
| DATED | : May 4, 2005 |
| INVENTOR(S) | : Keith G. Bunker et al. |

It is certified that error appears in the above-identified patent and that said Letters Patent is hereby corrected as shown below:

Title page,
Item [75], Inventors, insert the following:
-- Keith G. Bunker, Hilton, NY (US);
   Edward P. deJong, Rochester, NY (US);
   Bruce E. Talbert, Webster, NY (US) --.

This certificate supersedes Certificate of Correction issued January 31, 2006.

Signed and Sealed this

Twenty-seventh Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 6,731,447 B2 Page 1 of 1
APPLICATION NO. : 09/871877
DATED : May 4, 2004
INVENTOR(S) : Keith G. Bunker et al.

It is certified that error appears in the above-identified patent and that said Letters Patent is hereby corrected as shown below:

Title page,
Item [75], Inventors, insert the following:
-- Keith G. Bunker, Hilton, NY (US);
   Edward P. deJong, Rochester, NY (US);
   Bruce E. Talbert, Webster, NY (US) --.

This certificate supersedes the Certificate of Correction issued January 31, 2006 and November 27, 2007.

Signed and Sealed this

Twenty-ninth Day of January, 2008

JON W. DUDAS
*Director of the United States Patent and Trademark Office*